United States Patent
Murdock

(10) Patent No.: US 9,212,559 B2
(45) Date of Patent: Dec. 15, 2015

(54) ELECTRICAL GROUNDING FOR BLADES

(75) Inventor: James R. Murdock, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 628 days.

(21) Appl. No.: 13/606,408

(22) Filed: Sep. 7, 2012

(65) Prior Publication Data

US 2014/0069109 A1 Mar. 13, 2014

(51) Int. Cl.
*F01D 5/30* (2006.01)
*F01D 5/28* (2006.01)

(52) U.S. Cl.
CPC .............. *F01D 5/28* (2013.01); *F01D 5/3007* (2013.01); *F01D 5/3015* (2013.01); *F05D 2240/30* (2013.01); *F05D 2300/50* (2013.01); *Y02T 50/671* (2013.01)

(58) Field of Classification Search
CPC ........................................................ F01D 5/28
USPC ........................................................ 416/248
See application file for complete search history.

(56) References Cited

U.S. PATENT DOCUMENTS

| | | | |
|---|---|---|---|
| 4,802,824 A | 2/1989 | Gastebois et al. | |
| 5,123,813 A | 6/1992 | Przytulski et al. | |
| 5,720,597 A * | 2/1998 | Wang et al. | 416/229 A |
| 6,004,101 A | 12/1999 | Schilling et al. | |
| 7,780,419 B1 | 8/2010 | Matheny et al. | |
| 8,246,292 B1 * | 8/2012 | Morin et al. | 415/1 |
| 8,920,125 B2 * | 12/2014 | Welsh | 416/145 |
| 2004/0115052 A1 | 6/2004 | Murphy | |
| 2011/0142644 A1 | 6/2011 | Fritz et al. | |
| 2012/0003100 A1 | 1/2012 | James et al. | |
| 2012/0082553 A1 | 4/2012 | Eleftheriou et al. | |
| 2013/0156588 A1 * | 6/2013 | Murdock et al. | 416/220 R |

FOREIGN PATENT DOCUMENTS

| | | |
|---|---|---|
| EP | 2353830 | 8/2011 |
| EP | 2405101 | 1/2012 |

OTHER PUBLICATIONS

European Search Report for European Patent Application No. 12196763.2 completed Feb. 6, 2013.
International Search Report and Written Opinion for International Application No. PCT/US2013/057782 completed on Dec. 11, 2013.
International Preliminary Report on Patentability for International Application No. PCT/US2013/057782 mailed Mar. 19, 2015.

* cited by examiner

*Primary Examiner* — Ninh H Nguyen
*Assistant Examiner* — Jeffrey A Brownson
(74) *Attorney, Agent, or Firm* — Carlson, Gaskey & Olds, PC

(57) ABSTRACT

A rotor in a gas turbine engine has a rotor body with at least one slot receiving a blade. The blade has an outer surface formed of a first material and an airfoil extending from a dovetail. The dovetail is received in the slot. A grounding element is in contact with a portion of the dovetail formed of a second material that is more electrically conductive than the first material. The grounding element is in contact with a rotating element that rotates with the rotor and is formed of a third material. The first material is less electrically conductive than the third material. The grounding element and rotating element together form a ground path from the portion of the dovetail into the rotor.

20 Claims, 2 Drawing Sheets

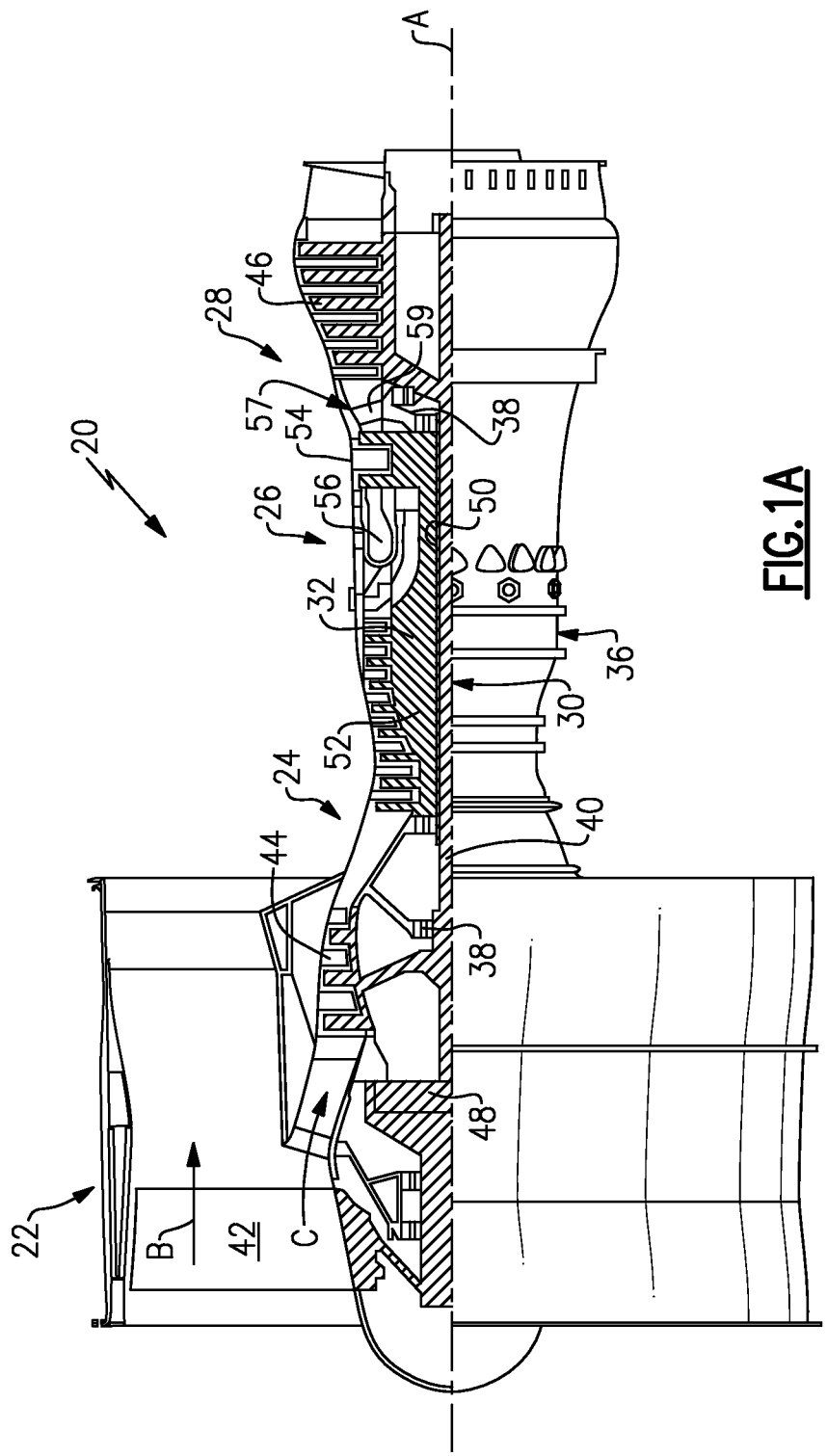

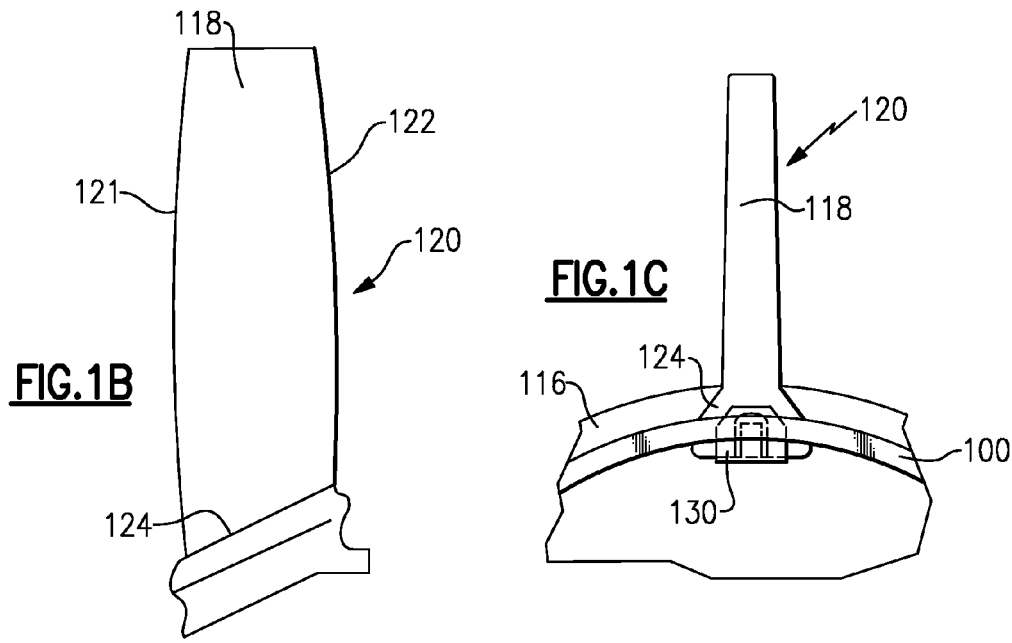
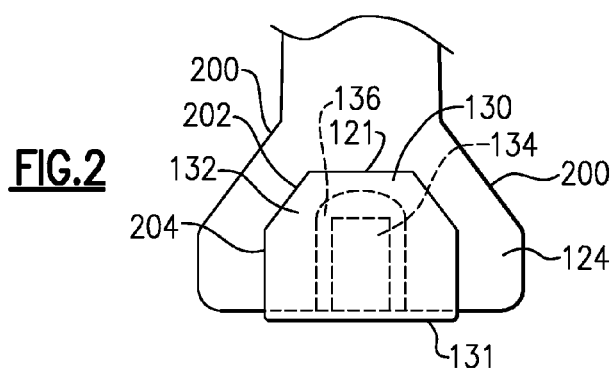
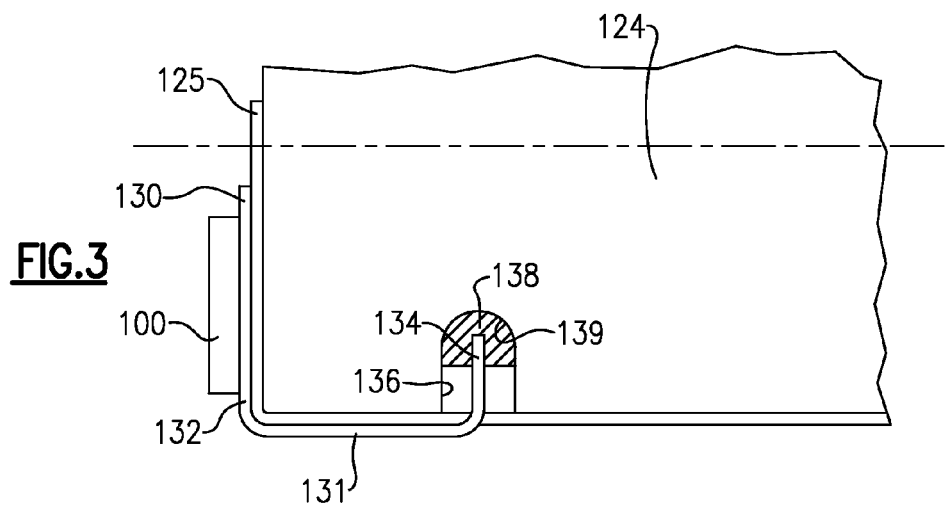

ELECTRICAL GROUNDING FOR BLADES

BACKGROUND OF THE INVENTION

This application relates to a structure for electrically grounding blades for use in a gas turbine engine.

Gas turbine engines are known, and typically include a fan delivering air into a compressor section. In the compressor section, the air is compressed and then delivered into a combustion section. The compressed air is mixed with fuel and burned in the combustion section. Products of this combustion pass downstream to drive turbine rotors.

The fan blades are subject to a large volume of air moving across an airfoil, and this can build up a large static electric charge. Conventionally, the fan blades were formed of a conductive metal that was grounded to a hub that mounts the fan blade. As such, the charge would dissipate.

More recently, fan blades have become larger. One factor driving the larger fan blades is the use of a gear reduction between a turbine driven spool which drives the fan blade and the spool. The gear reduction allows a single turbine rotor to drive both a compressor section and the fan, but at different speeds.

As the size of the fan blade has increased, its weight has also increased. As such, efforts have been made to reduce the weight of fan blades. One modification is to change the material for the fan blade from titanium to an aluminum. The aluminum fan blades have been covered with a polyurethane coating and fabric wear pads to protect the aluminum. These materials have insulation qualities and, thus, the blade may not be electrically grounded to a rotor.

SUMMARY OF THE INVENTION

In a featured embodiment, a rotor for use in a gas turbine engine has a rotor body with at least one slot receiving a blade. The blade has an outer surface formed of a first material and an airfoil extending from a dovetail. The dovetail is received in the slot. A grounding element is in contact with a portion of the dovetail formed of a second material that is more electrically conductive than the first material. The grounding element is in contact with a rotating element that rotates with the rotor. The rotating element is formed of a third material. The first material is less electrically conductive than the third material. The grounding element and rotating element together form a ground path from the portion of the dovetail into the rotor.

In another embodiment according to the previous embodiment, the first material includes an outer coating that is relatively non-conductive compared to the second and third materials.

In another embodiment according to any of the previous embodiments, the grounding element is formed of a material that is more electrically conductive than the first material.

In another embodiment according to any of the previous embodiments, the rotating element is separate from the rotor.

In another embodiment according to any of the previous embodiments, the rotating element is a lock ring which secures the blade within the rotor. The grounding element contacts the lock ring. The lock ring contacts the rotor to provide the grounding path.

In another embodiment according to any of the previous embodiments, the grounding element has a radially outwardly tang extending into a hole in the dovetail.

In another embodiment according to any of the previous embodiments, the hole is formed in a radially inner surface of the dovetail. The tang extends radially outwardly into the hole.

In another embodiment according to any of the previous embodiments, the tang is secured in a relatively conductive adhesive deposited in the hole.

In another embodiment according to any of the previous embodiments, the grounding element has a contact face that is polygonal, with angled sides associated with angled sides of the platform.

In another embodiment according to any of the previous embodiments, the first material includes a protective coating formed on the blade. The second material is aluminum.

In another featured embodiment, a gas turbine engine has a fan section, a compressor section, a combustor section, and at least one turbine rotor. The at least one turbine rotor drives a compressor rotor. The at least one turbine rotor also drives a rotor of the fan or compressor section through a gear reduction. The blade has an outer surface formed of a first material and an airfoil extending from a dovetail. The dovetail is received in the slot. A grounding element is in contact with a portion of the dovetail formed of a second material that is more electrically conductive than the first material. The grounding element is in contact with a rotating element that rotates with the rotor. The rotating element is formed of a third material. The first material is less electrically conductive than the third material. The grounding element and rotating element together form a ground path from the portion of the dovetail into the rotor.

In another embodiment according to the previous embodiment, the first material includes an outer coating that is relatively non-conductive compared to the second and third materials.

In another embodiment according to any of the previous embodiments, the grounding element is formed of a material that is more electrically conductive than the first material.

In another embodiment according to any of the previous embodiments, the rotating element is separate from the rotor.

In another embodiment according to any of the previous embodiments, the rotating element is a lock ring which secures the blade within the rotor. The grounding element contacts the lock ring. The lock ring contacts the rotor to provide the grounding path.

In another embodiment according to any of the previous embodiments, the grounding element has a radially outwardly tang extending into a hole in the dovetail.

In another embodiment according to any of the previous embodiments, the hole is formed in a radially inner surface of the dovetail. The tang extends radially outwardly into the hole.

In another embodiment according to any of the previous embodiments, the tang is secured in a relatively conductive adhesive deposited in the hole.

In another embodiment according to any of the previous embodiments, the grounding element has a contact face that is polygonal, with angled sides associated with angled sides of the platform.

In another embodiment according to any of the previous embodiments, the first material includes a protective coating formed on the blade. The second material is aluminum.

These and other features of the invention will be better understood from the following specifications and drawings, the following of which is a brief description.

BRIEF DESCRIPTION OF THE DRAWINGS

FIG. 1A shows an exemplary gas turbine engine.
FIG. 1B shows an aluminum blade.

FIG. 1C shows the aluminum blade mounted into a rotor.

FIG. 2 shows details of a grounding arrangement.

FIG. 3 is another view of the FIG. 2 embodiment.

DETAILED DESCRIPTION

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFCT")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

A fan blade 120 is illustrated in FIG. 1B having an airfoil 118 extending radially outwardly from a dovetail or root 124. A leading edge 121 and a trailing edge 122 define the forward and rear limits of the airfoil 118. Fan blade 120 may be used in an engine such as engine 20.

As shown in FIG. 1C, a fan rotor 116 receives the dovetail 124 to mount the fan blade 120 with the airfoil 118 extending radially outwardly. As the rotor is driven to rotate, it carries the fan blade 120 with it.

A lock ring 100 locks the blades 120 within the rotor 116 and rotates with the rotor 116.

As mentioned above, the lock ring 100 and rotor 116 may be formed of titanium or a titanium alloy, while the blade 120 may be formed of aluminum, but coated with a non-conductive coating, such as polyurethane coating 125 (see FIG. 3), or including fabric pads. As such, the fan blade 120 is not grounded.

A grounding element 130 is thus associated with the fan blade 120.

As can be seen in FIG. 2, the grounding element 130 has a contact or forward face 132 which is generally polygonal, with a radially outer face 121, sides 202 extending at an angle, and associated with sides 200 of the dovetail 124 of the blade 120, sides 204 extend from sides 202 and extend to a bottom surface 131. A upwardly extending grounding tang 134 is spaced into the plane of FIG. 2, and extends into a hole 136 formed in a bottom of the dovetail 124.

As shown in FIG. 3, the lock ring 100 is in contact with the grounding element 130 along with the forward face 132. The bottom radially inner portion 131 extends rearwardly to the tang 134 which extends radially outwardly into the hole 136 formed in the bottom of the dovetail. The tang 134 is shown secured in a conductive adhesive 138.

As can be appreciated, the lock ring 100 contacts the rotor 116, The lock ring 100 also contacts the grounding element at forward face 132, and provides an electrical connection through the tang 134 into the adhesive 138. The adhesive 138 can be read as being part of the grounding element. A surface 139 in the dovetail hole 136 is the underlying aluminum substrate, and thus provides a good conductive surface such that static electricity may be drained from the fan blade 120, and to the rotor 116. The location of the contact is such that it is generally protected from the elements such that there is unlikely to be corrosion at the connection.

As can be appreciated, the coating material 125 is less electrically conductive than the aluminum at surface 139, or the lock ring 100. However, the provision of the grounding element 130 still provides the grounding connection through the coating layer 125.

While the disclosed embodiment provides contact between the grounding element 130 and the lock ring 100, it is also possible to have the grounding element contact the rotor 116 directly. While the specified disclosure is to a fan blade, other blades, such as compressor and turbine blades, may benefit from these teachings.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A rotor for use in a gas turbine engine comprising:
    a rotor body having at least one slot receiving a blade;
    said blade having an outer surface formed of a first material and having an airfoil extending from a root, said root received in said slot;
    a grounding element in contact with a portion of said root, said grounding element formed of a second material that is more electrically conductive than said first material, and said grounding element being in contact with a rotating element that rotates with said rotor, said rotating element being formed of a third material, and said first material being less electrically conductive than said third material, said grounding element and said rotating element together forming a ground path from said portion of said root into said rotor; and
    wherein said grounding element has a radially outwardly tang extending into a hole in said root.

2. The rotor as set forth in claim 1, wherein said first material includes an outer coating that is relatively non-conductive compared to said second material and, said third material.

3. The rotor as set forth in claim 1, wherein said grounding element is formed of a material that is more electrically conductive than said first material.

4. The rotor as set forth in claim 1, wherein said rotating element is separate from said rotor.

5. The rotor as set forth in claim 4, wherein said rotating element is a lock ring which secures said blade within said rotor, said grounding element contacts said lock ring, and said lock ring contacts said rotor to provide said grounding path.

6. The rotor as set forth in claim 1, wherein said hole is formed in a radially inner surface of said root, and said tang extending radially outwardly into said hole.

7. The rotor as set forth in claim 6, wherein said tang is secured in a relatively conductive adhesive deposited in said hole.

8. The rotor as set forth in claim 1, wherein said grounding element has a contact face that is polygonal, with angled sides associated with angled sides of said foot.

9. The rotor as set forth in claim 1, wherein said first material includes a protective coating formed on said blade, and said second material is aluminum.

10. A gas turbine engine comprising:
    a fan section, a compressor section, a combustor section, and at least one turbine rotor, said at least one turbine rotor driving a compressor rotor, and said at least one turbine rotor also driving a rotor of said fan through a gear reduction;
    said rotor of said fan having a blade with an outer surface formed of a first material and having an airfoil extending from a root, said root received in a slot is said rotor of said fan;
    a grounding element in contact with a portion of said root, said grounding element formed of a second material that is more electrically conductive than said first material, and said grounding element being in contact with a rotating element that rotates with said rotor, said rotating element being formed of a third material, and said first material being less electrically conductive than said third material, said grounding element and said rotating element together forming a ground path from said portion of said root into said rotor; and
    said grounding element has a radially outwardly tang extending into a hole in said root.

11. The gas turbine engine as set forth in claim 10, wherein said first material includes an outer coating that is relatively non-conductive compared to said second and third materials.

12. The gas turbine engine as set forth in claim 10, wherein said grounding element is formed of a material that is more electrically conductive than said first material.

13. The gas turbine engine as set forth in claim 10, wherein said rotating element is separate from said rotor.

14. The gas turbine engine as set forth in claim 13, wherein said rotating element is a lock ring which secures said blade within said rotor, said grounding element contacts said lock ring, and said lock ring contacts said rotor to provide said grounding path.

15. The gas turbine engine as set forth in claim 10, wherein said hole is formed in a radially inner surface of said root, and said tang extending radially outwardly into said hole.

16. The gas turbine engine as set forth in claim 15, wherein said tang is secured in a relatively conductive adhesive deposited in said hole.

17. The gas turbine engine as set forth in claim 10, wherein said grounding element has a contact face that is polygonal, with angled sides associated with angled sides of said root.

18. The gas turbine engine as set forth in claim 10, wherein said first material includes a protective coating formed on said blade, and said second material is aluminum.

19. The rotor as set forth in claim 6, wherein said root is a dovetail.

20. The gas turbine engine as set forth in claim 15, wherein said root is a dovetail.

* * * * *

UNITED STATES PATENT AND TRADEMARK OFFICE
CERTIFICATE OF CORRECTION

| | | |
|---|---|---|
| PATENT NO. | : 9,212,559 B2 | Page 1 of 1 |
| APPLICATION NO. | : 13/606408 | |
| DATED | : December 15, 2015 | |
| INVENTOR(S) | : James R. Murdock | |

It is certified that error appears in the above-identified patent and that said Letters Patent is hereby corrected as shown below:

IN THE CLAIMS:

In claim 8, column 6, line 3: delete "foot" and replace with --root--

Signed and Sealed this
Tenth Day of May, 2016

Michelle K. Lee
*Director of the United States Patent and Trademark Office*